United States Patent
Toya (10) Patent No.: US 7,633,263 B2
(45) Date of Patent: Dec. 15, 2009

(54) BATTERY CHARGER

(75) Inventor: Shoichi Toya, Minamiawaji (JP)

(73) Assignee: Sanyo Electric Co., Ltd., Osaka (JP)

( * ) Notice: Subject to any disclaimer, the term of this patent is extended or adjusted under 35 U.S.C. 154(b) by 264 days.

(21) Appl. No.: 11/889,297

(22) Filed: Aug. 10, 2007

(65) Prior Publication Data

US 2008/0061733 A1   Mar. 13, 2008

(30) Foreign Application Priority Data

Aug. 11, 2006  (JP) .............................. 2006-219448

(51) Int. Cl.
*H02J 7/00* (2006.01)

(52) U.S. Cl. ........................ 320/108; 320/103; 320/111; 320/114; 320/115

(58) Field of Classification Search ................. 320/103, 320/108, 111–115
See application file for complete search history.

(56) References Cited

U.S. PATENT DOCUMENTS 5,959,433 A * 9/1999 Rohde ......................... 320/108
6,040,680 A * 3/2000 Toya et al. .................. 320/108
6,538,413 B1 * 3/2003 Beard et al. ................. 320/114
7,164,255 B2 * 1/2007 Hui ............................. 320/108
7,471,062 B2 * 12/2008 Bruning ...................... 320/108
2007/0182367 A1 * 8/2007 Partovi ....................... 320/108

FOREIGN PATENT DOCUMENTS

JP           2005-6440         1/2005

* cited by examiner

*Primary Examiner*—Edward Tso
*Assistant Examiner*—Ramy Ramadan
(74) *Attorney, Agent, or Firm*—Wenderoth, Lind & Ponack, L.L.P.

(57) ABSTRACT

High frequency power supplied to the primary coil from the high frequency power supply is transferred to the secondary coil by magnetic induction, and secondary coil AC is rectified to charge the battery pack housed in the portable electronic equipment. The battery charger is provided with internal batteries that are charged by input power and supply power to the high frequency power supply, and with a charging circuit to charge the internal batteries. The external case is provided with storage space between its top plate and bottom plate, and internal batteries, which are rectangular batteries, and a planar primary coil wound in a spiral shape are disposed in that storage space. The battery charger charges the internal batteries with input power, and when no power is input, internal battery power is converted to high frequency power and supplied to the primary coil to charge the battery pack.

22 Claims, 7 Drawing Sheets

32a FLAT SURFACE

FIG. 10

44 ELECTROMAGNETIC ABSORPTION LAYER  45 RECESSED REGION

FIG. 11

48 ELECTROMAGNETIC ABSORPTION LAYER

FIG. 12

BATTERY CHARGER

BACKGROUND OF THE INVENTION

1. Field of the Invention

This invention relates to a battery charger without electrical contacts, and to the combination of this battery charger without electrical contacts and portable electronic equipment.

2. Description of Related Art

A battery charger without electrical contacts is cited, for example, in Japanese Patent Application Disclosure 2005-6440. In this type of battery charger, a battery pack contained in portable electronic equipment can be charged by placing the portable electronic equipment on top of the battery charger without connecting any electrical connectors or contacts. Consequently, the battery charger has the characteristic that batteries inside portable electronic equipment of various different forms can be charged by setting the electronic equipment on a single battery charger with no electrical contacts. For example, this characteristic allows use of many different forms of portable electronic equipment, and is particularly convenient for charging portable telephones, which rapidly change model styles.

The battery charger without electrical contacts cited in the Japanese Patent Application Disclosure 2005-6440 is provided with a pocket for inserting portable electronic equipment on a charging pad having a primary coil as shown in FIG. 5 of that disclosure. A secondary coil is housed in the portable electronic equipment. The secondary coil of the portable electronic equipment inserted in the pocket magnetically couples to the primary coil. Consequently, if high frequency electrical power is supplied to the primary coil, high frequency electrical power is induced in the secondary coil. The portable electronic equipment converts the alternating current (AC) induced in the secondary coil to direct current (DC) to charge batteries housed in the electronic equipment.

In the battery charger without electrical contacts of Japanese Patent Application Disclosure 2005-6440, the charging pad is connected to a high frequency power supply via wire leads and high frequency electrical power is supplied to the primary coil. Specifically, high frequency electrical power is input from wire leads to charge batteries in the portable electronic equipment placed in the pocket of the charging pad. Portable electronic equipment batteries cannot be charged unless the wire leads of this battery charger are connected to a high frequency power supply. In practical application, there are time constraints on portable electronic equipment such as the portable telephone, and there can be times when it is necessary to disconnect and take a telephone away from the battery charger in a state of incomplete charge. For this type of usage, the battery charger without electrical contacts of Japanese Patent Application Disclosure 2005-6440 can become unable to charge the batteries of the portable electronic equipment.

The present invention was developed to resolve this drawback. Thus, it is a primary object of the present invention to provide a battery charger without electrical contacts that can charge portable electronic equipment batteries even when input power has been cut-off.

SUMMARY OF THE INVENTION

The battery charger without electrical contacts of the present invention is provided with the following structure to achieve the object above. The battery charger without electrical contacts is provided with a primary coil 13 that magnetically couples with a secondary coil 33 housed in the portable electronic equipment 30, a high frequency power supply 14 that supplies high frequency power to the primary coil 13, and an external case 11 to house the primary coil 13 and high frequency power supply 14. In this battery charger, the high frequency power supply 14 converts input power to high frequency power and supplies it to the primary coil 13. High frequency power in the primary coil 13 is conveyed to the secondary coil 33 by magnetic induction, and secondary coil 33 AC is rectified to charge the battery pack housed in the portable electronic equipment. The battery charger is also provided with internal batteries 12 that are charged by input power to supply power to the high frequency power supply 14, and a charging circuit 15 that charges the internal batteries 12 with input power. The external case 11 is formed as a flat panel of given thickness providing storage space 18 to hold the internal batteries 12 between a top plate 11A and bottom plate 11B. The internal batteries 12 housed in the storage space 18 of the external case 11 are rectangular batteries. These rectangular batteries are held in the storage space 18 with opposing flat sides 12a disposed parallel to the top plate 11A and bottom plate 11B. In addition, a planar, spirally wound primary coil 13 is disposed in the storage space 18 or top plate 11A of the external case 11. The battery charger charges the internal batteries 12 with input power. When power is not input to the battery charger, power is supplied to the high frequency power supply 14 from the internal batteries 12, converted to high frequency power, and supplied to the primary coil 13 to charge the portable electronic equipment 30 battery pack.

The battery charger without electrical contacts described above has the characteristic that the battery pack of portable electronic equipment can be charged even when external power is not being input to the battery charger. This is because the battery charger of the present invention contains internal batteries and a charging circuit. When no external power is input, the internal batteries supply power to the high frequency power supply, the high frequency power supply outputs high frequency power to the primary coil, and electric power is transferred to the portable electronic equipment via the primary coil to allow the battery pack to be charged. In addition, the external case of the battery charger, which houses the primary coil, the high frequency power supply, and internal batteries, is in the form of a flat panel that provides storage space between its top and bottom plates. The internal batteries are rectangular batteries, which are disposed in the storage space with opposing flat sides parallel to the top and bottom plates. Further, the primary coil is wound in a spiral shape in a single plane. Consequently, the overall battery charger is lightweight, thin, small, and convenient to carry.

The internal batteries 12 of the battery charger without electrical contacts of the present invention can be lithium ion rechargeable batteries or lithium polymer batteries.

The battery charger has the characteristic that while overall it is lightweight, thin, small, and convenient to carry, battery pack batteries of portable electronic equipment can be charged sufficiently even out where external power input is unavailable. This is because lithium ion rechargeable batteries or lithium polymer batteries are used, and they are rectangular batteries that have large capacity per unit volume.

The battery charger without electrical contacts of the present invention is provided with DC input terminals 17 in the external case 11, and those DC input terminals 17 can be connected to the high frequency power supply 14 and the charging circuit 15.

There is no necessity for the external case of the battery charger to house a large, heavy power supply for commercial AC power, and the external case can be made in a remarkably lightweight, thin, small, and convenient to carry configuration. This is because DC input terminals are provided in the external case, and these DC input terminals are connected to the high frequency power supply and charging circuit.

In the battery charger without electrical contacts of the present invention, the DC input terminals 17 comprise AC adapter connection terminals 17A and USB terminals 17B. The connection terminals 17A and the USB terminals 17B can be connected to the high frequency power supply 14 and the charging circuit 15. The DC input terminals 17 can be disposed on the side of the external case 11.

In addition, since DC input terminals comprising AC adapter connection terminals and USB terminals are provided, the battery charger can be connected to an AC adapter via the connection terminals, or a computer via the USB terminals to charge the battery pack of portable electronic equipment. Therefore, the portable electronic equipment battery pack can also be charged without an AC adapter by using a computer. In particular, the battery charger of the present invention has the characteristic that with AC adapter or USB connections in place, wire leads are parallel with the flat panel external case and the unit does not become bulky. This is because the DC input terminals are disposed on the side of the external case and do not increase the thickness of the external case.

The internal batteries 12, primary coil 13, high frequency power supply 14, and charging circuit 15 can be disposed in the same plane inside the storage space in the external case 11 of the battery charger without electrical contacts of the present invention.

The external case of this battery charger can be made especially thin and convenient to carry. This is because the internal batteries, primary coil, high frequency power supply, and charging circuit are disposed in a single plane in the storage space of the external case. Further, since the primary coil and internal batteries are not stacked or overlapping and can be separated in a planar fashion, effects of the primary coil on the internal batteries can be minimized. In particular, since the primary coil is planar and wound in a spiral shape, lines of magnetic force radiate out in a direction perpendicular relative to the plane of the coil. The internal batteries are not disposed directly in the direction of the coil's lines of magnetic force, and are protected against adverse effects of the coil's magnetic field. For example, internal batteries are protected against magnetic induction in the battery case (eddy currents or Foucault currents) that can cause adverse effects such as battery heating. Further, since the magnetic field from the primary coil does not affect the internal batteries, the characteristic of higher efficiency transfer of electrical power from the primary coil to the secondary coil can be realized.

The battery charger without electrical contacts of the present invention can house a plurality of internal batteries 12 in the same plane inside the storage space 18 in the external case 11.

This battery charger has the characteristic that the case can be made thin while charge capacity is increased by housing a plurality of internal batteries. This is because a plurality of batteries can be disposed in a single plane in the storage space of the external case.

In the combination of the battery charger without electrical contacts and portable electronic equipment of the present invention, the battery pack 31, 51 housed in the portable electronic equipment 30 is provided with a secondary coil 33 and a rectifying circuit 34 that rectifies AC induced in the secondary coil 33. Rectifying circuit 34 output is input to the portable electronic equipment.

With this structure, since the battery pack housed in the portable electronic equipment is provided with a secondary coil and a rectifying circuit to rectify AC induced in the secondary coil, and since rectifying circuit output is input to the portable electronic equipment, the battery pack can be efficiently charged by electrical power induced in the secondary coil. This is because electrical power induced in the secondary coil is not stabilized prior to transfer to the portable electronic equipment, and no power loss results due to stabilization.

In the combination of the battery charger without electrical contacts and portable electronic equipment of the present invention, the battery pack 51 contained in the portable electronic equipment can house a full charge detection circuit 59 to detect rechargeable battery full charge. The battery charger 10 can house a charge termination circuit 29 to suspend charging when it detects a full charge signal output from the full charge detection circuit 59.

With this configuration, the battery charger can switch the power supply off after the battery pack has been fully charged to prevent wasted power consumption. This is because the battery pack housed in the portable electronic equipment contains a full charge detection circuit to detect rechargeable battery full charge and issue a full charge signal, and the battery charger contains a charge termination circuit to detect the full charge signal and stop charging. In particular, this configuration can effectively prevent wasted internal battery power consumption when the portable electronic equipment battery pack is charged via internal batteries in the battery charger.

In the combination of the battery charger without electrical contacts and portable electronic equipment of the present invention, the battery pack 31 can be provided with a rectangular battery having two opposing flat surfaces 32a. The secondary coil 33 can be disposed on a flat surface 32a of the rectangular battery via an electromagnetic absorption layer 44.

In the combination of the battery charger without electrical contacts and portable electronic equipment of the present invention, the electromagnetic absorption layer 44 can be provided with a recessed region 45 and the secondary coil 33 can be disposed in that recessed region 45.

In the combination of the battery charger without electrical contacts and portable electronic equipment of the present invention, the secondary coil 33 can be inserted and fixed in the electromagnetic absorption layer 44 by insertion molding.

In the combination of the battery charger without electrical contacts and portable electronic equipment of the present invention, the secondary coil 33 can be sandwiched between an electromagnetic absorption layer 48 and a laminate 46.

Since the rechargeable battery in the battery pack described above is a rectangular battery with two opposing flat surfaces and the secondary coil is disposed on a flat surface via an electromagnetic absorption layer, the rechargeable battery can be protected from the effects of the magnetic field of the primary coil. In particular, by providing a recessed region in the electromagnetic absorption layer and housing the secondary coil in the recessed region, by fixing the secondary coil in the electromagnetic absorption layer by insertion molding, or by sandwiching the secondary coil between the electromagnetic absorption layer and a laminate, the unit has the characteristic that the electromagnetic absorption layer and secondary coil can be attached to a flat surface of the rectangular battery in a simple manner.

The above and further objects of the present invention as well as features thereof will become more apparent from the following detailed description to be made in conjunction with the accompanying drawings.

DETAILED DESCRIPTION OF THE PREFERRED EMBODIMENT(S)

The battery charger 10 shown in FIGS. 1-6 charges a battery pack 31 housed in portable electronic equipment 30, which is a portable telephone. However, the portable electronic equipment of the present invention is not limited to a portable telephone. This is because all battery packs housed in portable electronic equipment can be charged.

The battery charger without electrical contacts 10 of FIGS. 1-6 is provided with a primary coil 13 magnetically coupled to a secondary coil 33 housed in the portable electronic equipment 30, a high frequency power supply 14 that supplies high frequency power to the primary coil 13, internal batteries 12 that supply power to the high frequency power supply 14, a charging circuit 15 for the internal batteries 12, and an external case 11 to hold the primary coil 13, high frequency power supply 14, internal batteries 12, and charging circuit 15. In this battery charger without electrical contacts 10, input power is converted to high frequency power by the high frequency power supply 14 and supplied to the primary coil 13. Primary coil 13 high frequency power is transferred to the secondary coil 33 by magnetic induction. AC high frequency power is induced in the secondary coil 33, rectified, and used to charge the battery pack 31 housed in the portable electronic equipment 30.

The battery charger without electrical contacts of the figures does not simply charge the portable electronic equipment 30 battery pack 31 via input power. In a situation with no input power, the internal batteries 12 supply power to the high frequency power supply 14 to charge the portable electronic equipment 30 battery pack 31. Internal batteries 12, which supply power to the high frequency power supply 14 with no input power, are lithium ion rechargeable batteries or lithium polymer batteries. Further, the internal batteries 12 are thin rectangular batteries. The internal batteries 12 are charged by the charging circuit 15. The charging circuit 15 converts input power to the internal battery charging voltage to charge the internal batteries 12. Since the internal batteries 12 are lithium ion or lithium polymer batteries, the charging circuit 15 is a constant current, constant voltage charging circuit. The charging circuit 15 charges the internal batteries 12 with constant current to a specified voltage, then after battery voltage has reached a set value, it charges the internal batteries 12 to full charge with constant voltage charging.

With portable electronic equipment 30 set in position, the high frequency power supply 14 supplies high frequency power to the primary coil 13 to charge the portable electronic equipment 30 battery pack 31. The high frequency power supply 14 contains an electronic equipment detection circuit 16 to determine if the portable electronic equipment 30 is set in position for charging. The electronic equipment detection circuit 16 receives an electronic equipment data signal transmitted from the portable electronic equipment 30 to determine that the portable electronic equipment 30 is set in position. With portable electronic equipment not set in position for charging, the high frequency power supply 14 cuts-off supply of high frequency power to the primary coil 13. This battery charger 10 can prevent wasted consumption of input power, and can prevent wasted discharge of the internal batteries 12.

The high frequency power supply 14 is supplied with DC power from either an AC adapter 40, a USB cable, or the internal batteries 12. The battery charger without electrical contacts 10 of the figures does not house a commercial power supply circuit to convert commercial power (120V AC in the USA) to DC at the voltage of the high frequency power supply 14. In a battery charger without electrical contacts 10 that does not house a commercial power supply circuit, the external case 11 can be made thin. This is because it does not contain a power supply transformer required for a commercial power supply circuit. The battery charger without electrical contacts 10 is provided with DC input terminals 17 in the external case 11. The DC input terminals 17 comprise AC adapter connection terminals 17A and USB terminals 17B for USB cable connection. The connection terminals 17A and USB terminals 17B are connected to the high frequency power supply 14 and supply input DC power to the high frequency power supply 14.

Figure 1:
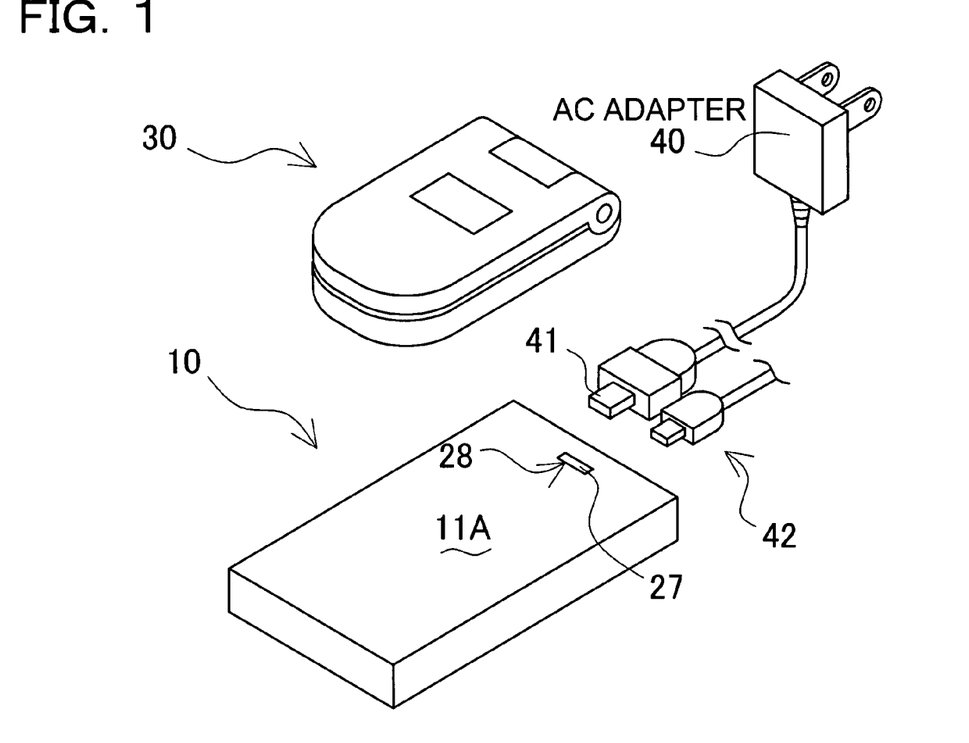
FIG. 1 is a perspective view showing the situation for setting portable electronic equipment on the battery charger without electrical contacts for one embodiment of the present invention.
Figure 2:
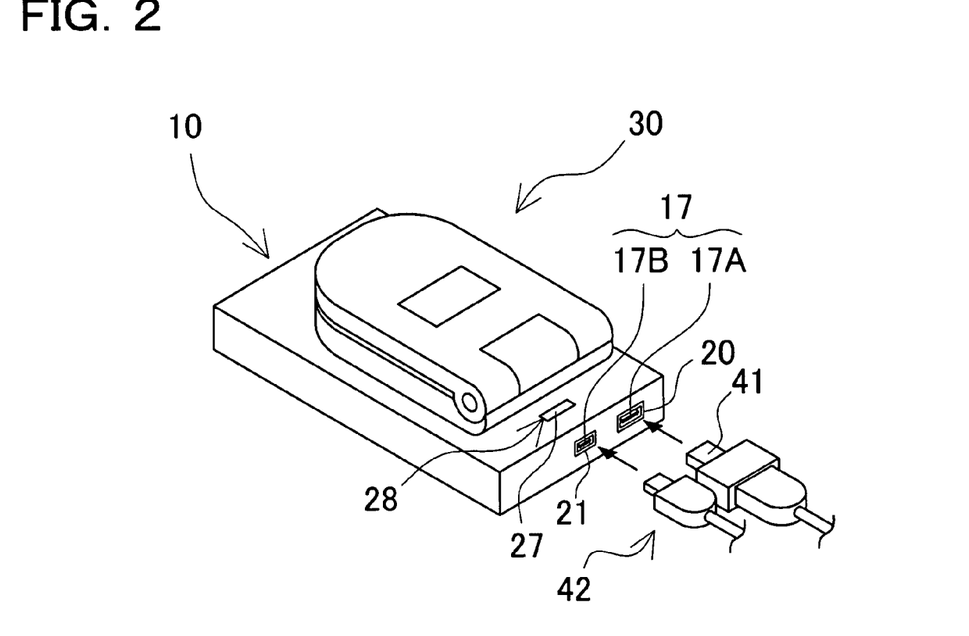
FIG. 2 is a perspective view showing the situation for supplying input power to the battery charger shown in FIG. 1 to charge the portable electronic equipment battery pack.

DC power is supplied to the high frequency power supply 14 of the battery charger without electrical contacts 10 of FIG. 1 by connecting an AC adapter connection plug 41 to the connection terminals 17A or by connecting a computer to the USB terminals 17B via a USB cable 42 as shown in FIG. 2. When portable electronic equipment 30 is set in position and DC power is supplied, the high frequency power supply 14 supplies high frequency power to the primary coil 13 to charge the portable electronic equipment 30 battery pack 31. At this time, the internal battery charging circuit 15 is also activated to charge the internal batteries 12. However, if current sourcing capacity of the AC adapter 40 or computer connected to the USB terminals 17B is insufficient, input power will only be supplied to the high frequency power supply 14 and only the portable electronic equipment 30 battery pack 31 will be charged. After the portable electronic equipment 30 battery pack 31 is fully charged, input power is supplied to the charging circuit 15 and the internal batteries 12 are charged. Further, when portable electronic equipment 30 is not set in position for charging and the internal batteries 12 are not fully charged, input power is supplied to the charging circuit 15 and the internal batteries 12 are charged. When the internal batteries 12 are fully charged, the charging circuit 15 suspends charging of the internal batteries 12. As much as possible, the internal batteries 12 are maintained in a fully charged state. When DC power is input from an AC adapter 40 or computer, DC power can be supplied to the high frequency power supply 14 from the internal batteries 12 as well. In this situation, the high frequency power of the high frequency power supply 14 can be increased to fully charge the portable electronic equipment 30 battery pack 31 in a short period. However, when the remaining capacity of the internal batteries 12 is not sufficient, supply of DC power from the internal batteries 12 to the high frequency power supply 14 is suspended. The high frequency power supply 14 detects remaining capacity of the internal batteries 12, and DC power is supplied to the high frequency power supply 14 from the internal batteries 12 when remaining capacity is found to be greater than a set capacity.

Figure 3:
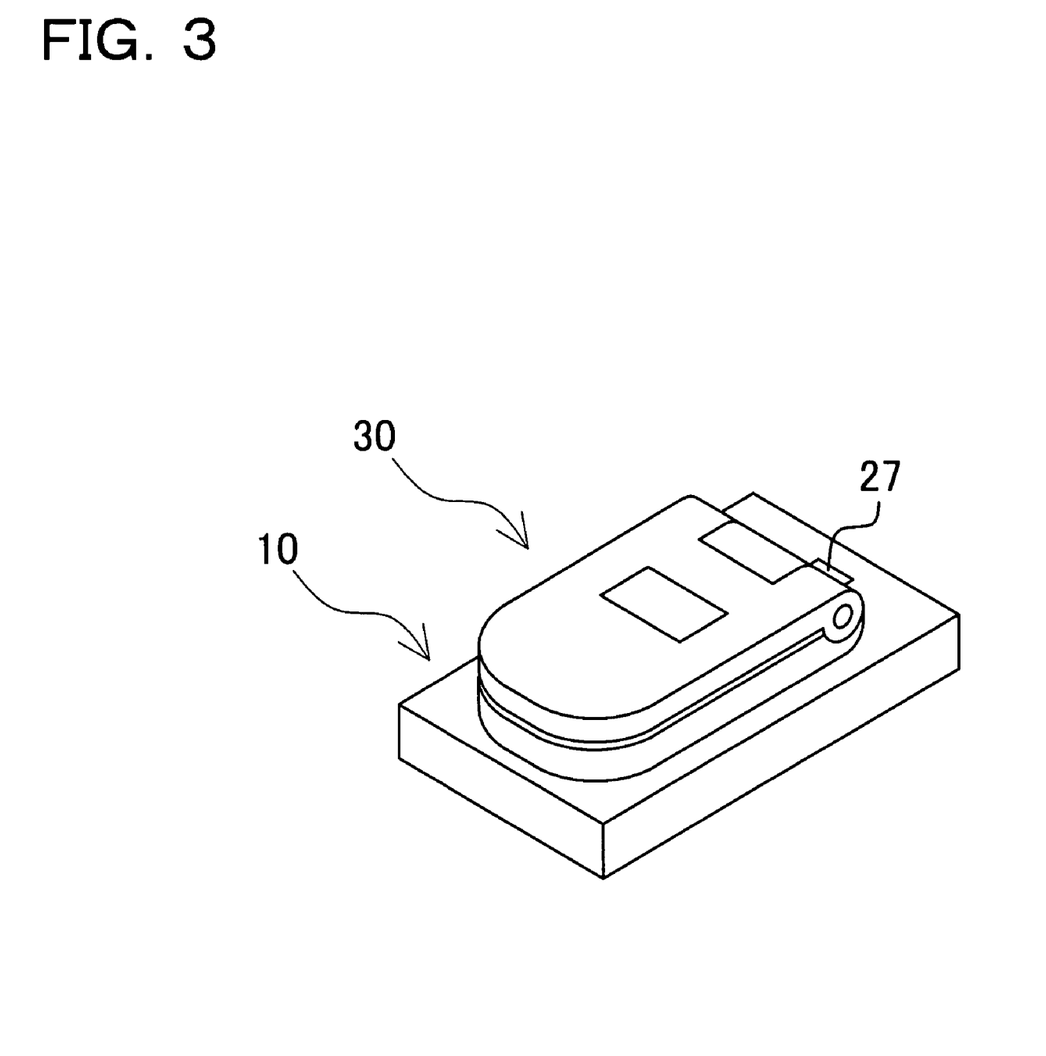
FIG. 3 is a perspective view showing the situation for charging the portable electronic equipment battery pack with the internal batteries of the battery charger shown in FIG. 1.
Figure 5:
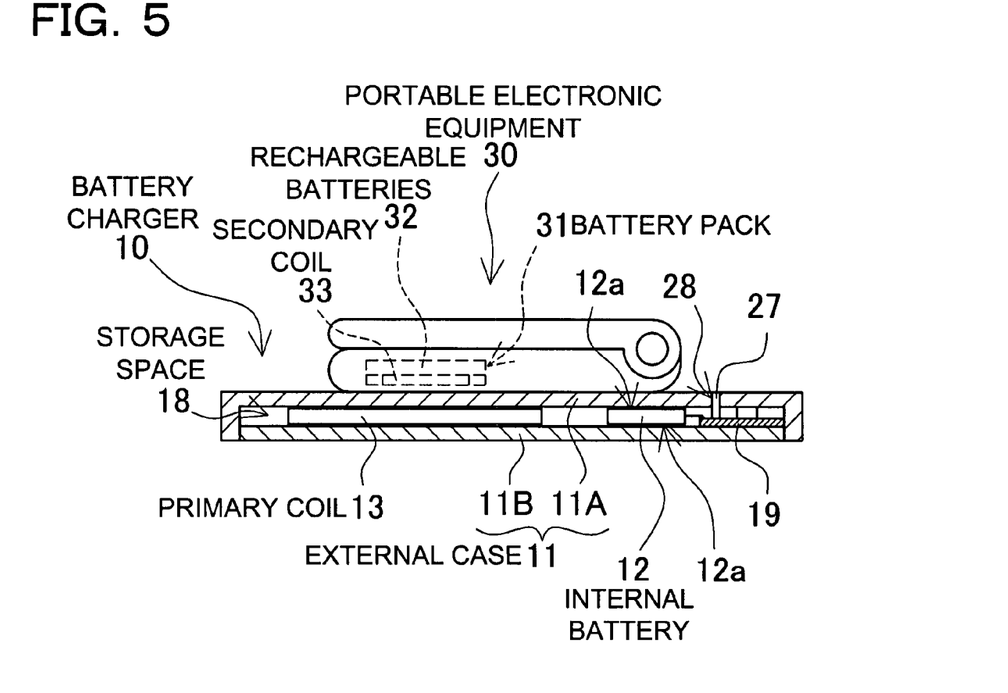
FIG. 5 is a vertical cross-sectional view showing portable electronic equipment set on the battery charger shown in FIG. 1.

As shown in FIGS. 2, 3, and 5, portable electronic equipment 30 is placed on top of the external case 11 of the battery charger 10 to charge the battery pack 31. To charge the portable electronic equipment 30 battery pack 31 in this arrangement, the external case 11 is formed as a flat panel of given thickness to provide storage space 18 to hold the internal batteries 12 between its top plate 11A and bottom plate 11B. Further, the outline of the top plate 11A is made large enough to stably position portable electronic equipment 30 on the top plate 11A. In addition, the battery charger without electrical contacts shown in the figures is made as a thin, flat panel to allow it to be conveniently carried with portable electronic equipment 30 such as a portable telephone. Because the battery charger 10 is a thin, flat panel shape, it can be carried inside a bag without taking up too much space much as a notebook or other thin book.

Figure 4:
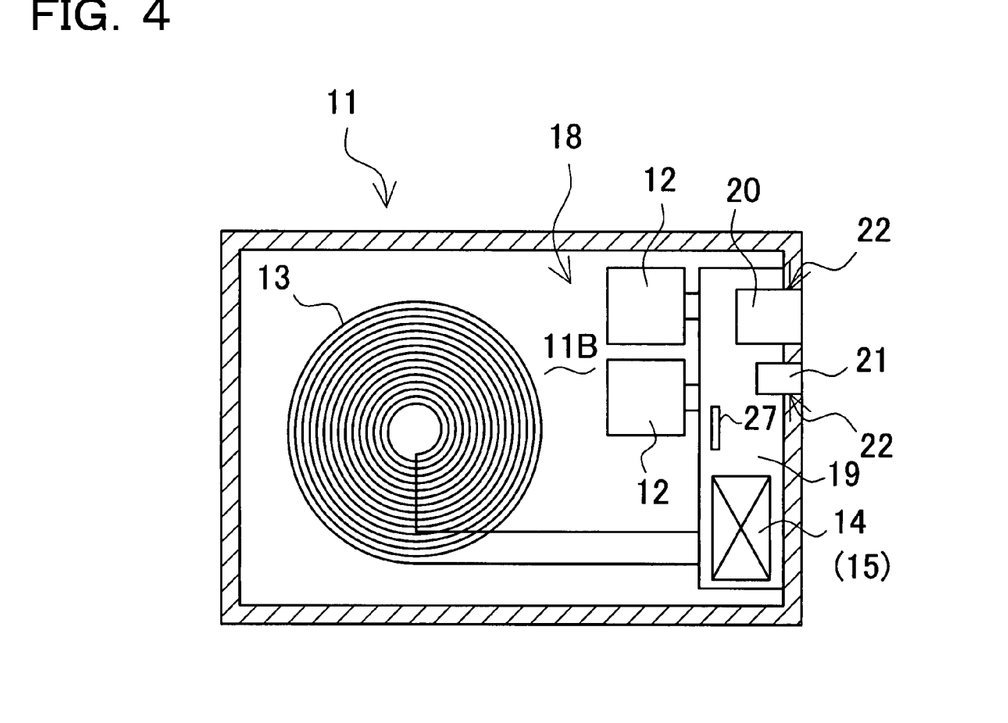
FIG. 4 is a plan view in cross-section of the battery charger shown in FIG. 1.

In the battery charger without electrical contacts 10 of the figures, thin rectangular batteries are housed inside the thin, flat panel external case 11. The thin rectangular batteries, which are thinner than they are wide, are contained in the storage space 18 with their opposing flat surfaces 12a oriented parallel to the top plate 11A and the bottom plate 11B of the external case 11. To further reduce overall thickness of the case, the internal batteries 12, primary coil 13, high frequency power supply 14, and charging circuit 15 of the battery charger of FIG. 4 are disposed in a single plane in the storage space 18 of the external case 11. Electronic parts to implement the high frequency power supply 14 and charging circuit 15 are mounted on the surface of a single circuit board 19, which is disposed parallel to the top plate 11A and the bottom plate 11B. A connector 20 for the AC adapter connection terminals 17A and a connector 21 for the USB terminals 17B are also attached to the circuit board 19 in the battery charger 10 of FIG. 4. These connectors 20, 21 are exposed externally via terminal windows 22 cut through the side of the external case 11, and are fixed to a sidewall of the external case 11. In the external case 11 of FIG. 4, the primary coil 13 is disposed in the left side of the case, the circuit board 19 holding the high frequency power supply 14 and charging circuit 15 is disposed in the right side of the case, and the internal batteries 12 are disposed between the primary coil 13 and circuit board 19. These components are disposed in the storage space 18 without any stacking or overlapping to make the external case 11 thin. The thickness of the external case 11 is made greater than or equal to 3 mm and less than or equal to 20 mm, preferably greater than or equal to 5 mm and less than or equal to 15 mm, and more preferably approximately 10 mm. The external case 11 of the figures has a rectangular top plate 11A and bottom plate 11B, but the top and bottom plates can also be made in elliptical shapes.

The primary coil 13 housed in the external case 11 is made as a planar coil wound in a spiral shape to fit in the storage space 18 of the thin external case 11. To allow efficient transfer of high frequency power to the portable electronic equipment 30 secondary coil 33, the primary coil 13 is made essentially as large as the entire external case 11. The primary coil can also be insertion molded and fixed in a plastic external case top plate. An external case with an insertion molded primary coil can be made even thinner. Insertion molding allows solid attachment of the primary coil to the external case, and since the primary coil is disposed on the surface of the top plate, the gap between primary and secondary coils is narrowed allowing efficient transfer of high frequency power. The inductance of the primary coil is set to an optimum value depending on the frequency of the high frequency power. For a battery charger 10 with high frequency power at 100 kHz to 500 kHz, the inductance of the primary coil is set from tens of μH to several mH.

Figure 6:
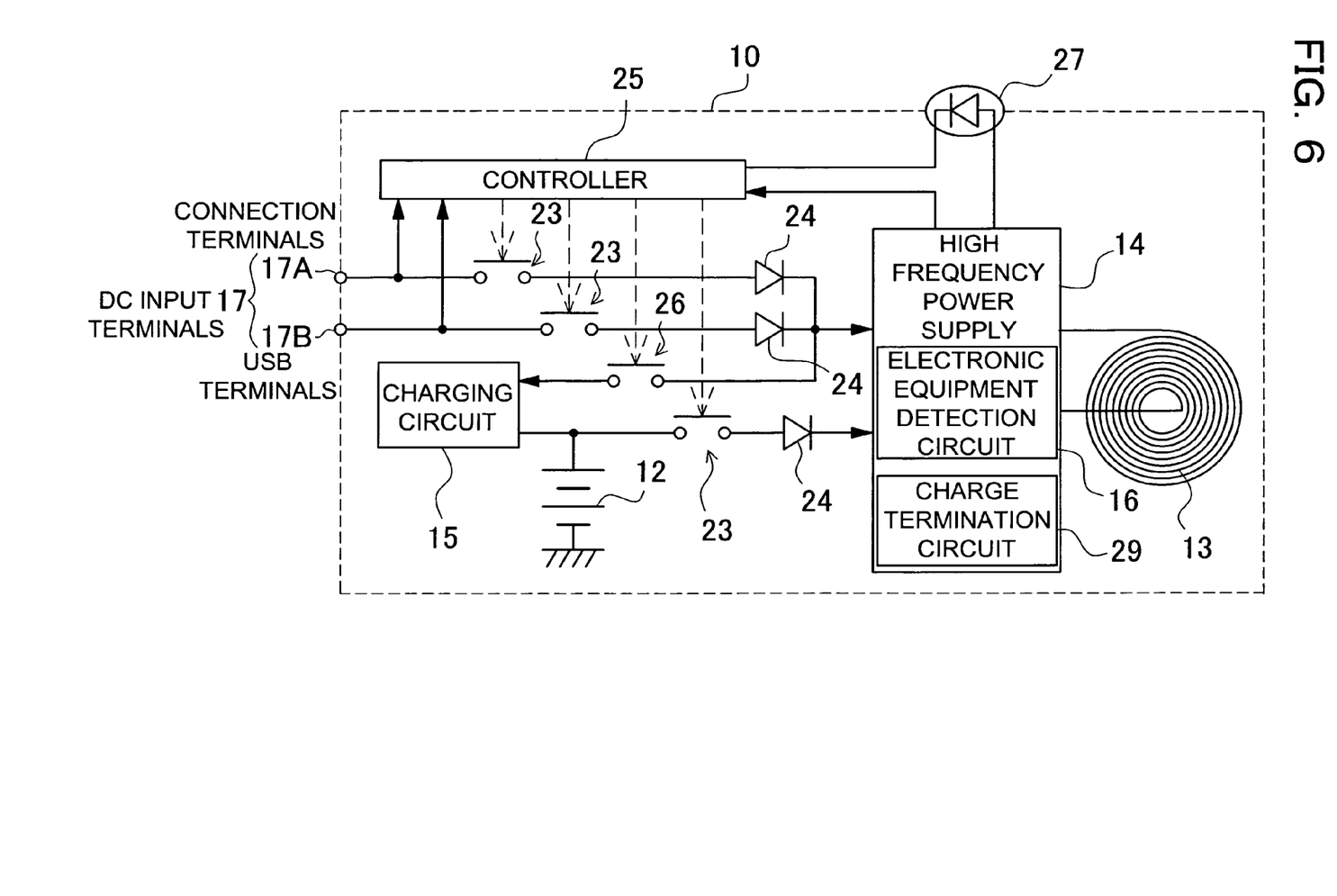
FIG. 6 is a circuit diagram of the battery charger shown in FIG. 1.

In the battery charger shown in the circuit diagram of FIG. 6, AC adapter connection terminals 17A, USB terminals 17B, and internal batteries 12 are connected to the power supply circuit of the high frequency power supply 14 via series connected switches 23 and diodes 24. Diodes 24 prevent the flow of reverse currents when DC power is input simultaneously from a plurality of DC input terminals 17 or from the internal batteries 12. Each switch 23 is controlled ON and OFF by a controller 25. The controller selects and turns ON any single switch 23 or a plurality of switches 23 to supply DC power to the high frequency power supply 14 through the ON switches 23. The controller detects an electronic equipment data signal induced in the primary coil 13 to determine that portable electronic equipment is set for charging, it turns ON any switch 23, and it supplies high frequency power to the primary coil 13.

The controller 25 detects portable electronic equipment 30 set for charging, it detects DC power input from AC adapter connection terminals 17A or USB terminals 17B, and it turns ON switches 23 connected to the AC adapter connection terminals 17A and USB terminals 17B. The controller detects the electronic equipment data signal sent from the portable electronic equipment 30 to determine that the portable electronic equipment is set for charging. The controller 25 also detects the voltage at the DC input terminals 17, which are the AC adapter connection terminals 17A and USB terminals 17B, to determine that an AC adapter 40 or USB cable 42 is connected. When the controller 25 confirms that the portable electronic equipment 30 is set in position and DC power is input from both the AC adapter connection terminals 17A and USB terminals 17B, it turns ON one or both of the DC input terminal 17 switches 23. When DC power is input from either the AC adapter connection terminals 17A or the USB terminals 17B, the controller 25 switches ON the switch 23 connected to the terminals with the DC power to input that power to the high frequency power supply 14.

Further, when portable electronic equipment 30 is set for charging and no DC power is input from either the AC adapter connection terminals 17A or USB terminals 17B, the controller 25 turns ON the switch 23 connected to the internal batteries 12 to supply power to the high frequency power supply 14 from the internal batteries 12. In this case, the controller 25 detects internal battery remaining capacity and confirms the internal batteries 12 can be discharged. Then the controller 25 switches ON the internal battery switch 23 to supply power to the high frequency power supply 14 from the internal batteries 12. When internal battery remaining capacity becomes low and over-discharge is incipient, the controller 25 switches OFF the switch 23 connecting the internal batteries 12 and the high frequency power supply 14 to suspend internal battery discharge.

When the controller 25 determines that the internal batteries 12 are not fully charged, that portable electronic equipment 30 is not set for charging, and that DC power is input from either the AC adapter connection terminals 17A or USB terminals 17B, it switches ON the charging switch 26 connected between the DC input terminals 17 and the charging circuit 15. Under these conditions, the charging circuit 15 charges the internal batteries 12. When the internal batteries 12 reach full charge, the controller 25 switches the charging switch 26 OFF to suspend internal battery 12 charging. When DC power input from the AC adapter connection terminals 17A and USB terminals 17B is greater than the power consumed by the high frequency power supply 14, internal batteries 12 can be charged while supplying power to the high frequency power supply 14. In this case, with portable electronic equipment 30 set for charging, the controller 25 supplies DC power to the high frequency power supply 14 while charging the internal batteries 12. Consequently, this battery charger 10 charges its internal batteries 12 while it charges the portable electronic equipment 30 battery pack 31. The high frequency power supply 14 can detect internal battery 12 voltage and determine remaining capacity. Remaining capacity can be computed from the integral of internal battery 12 charging current and discharging current, and the computed remaining capacity can also be corrected using the battery voltage.

The battery charger 10 of the figures is provided with a display section to show internal battery 12 remaining capacity. The display section shown in the figures is a set of light emitting diodes (LEDs) 27. The LEDs 27 are connected to the high frequency power supply 14 and controller 25, and their state of conduction for light emission is controlled by the controller 25. The LEDs 27 are mounted on the circuit board 19, which holds them in a specified location inside the external case 11. A display window 28 is opened through the external case 11 at a location corresponding to the LED 27 location, and LED 27 indications can be seen externally through this display window 28. The controller 25 controls the ON and OFF state of the LEDs 27 according to internal battery 12 remaining capacity detected by the high frequency power supply 14, and internal battery 12 remaining capacity is indicated by the ON and OFF pattern of the LEDs 27.

Figure 7:
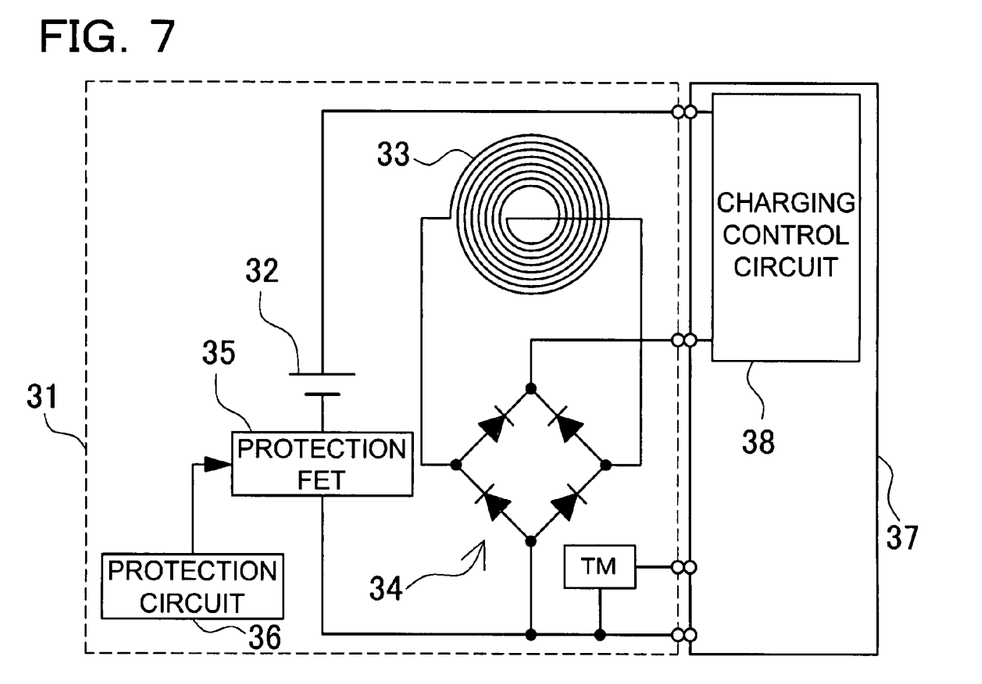
FIG. 7 is a circuit diagram showing one embodiment of the battery pack housed in the portable electronic equipment.
Figure 8:
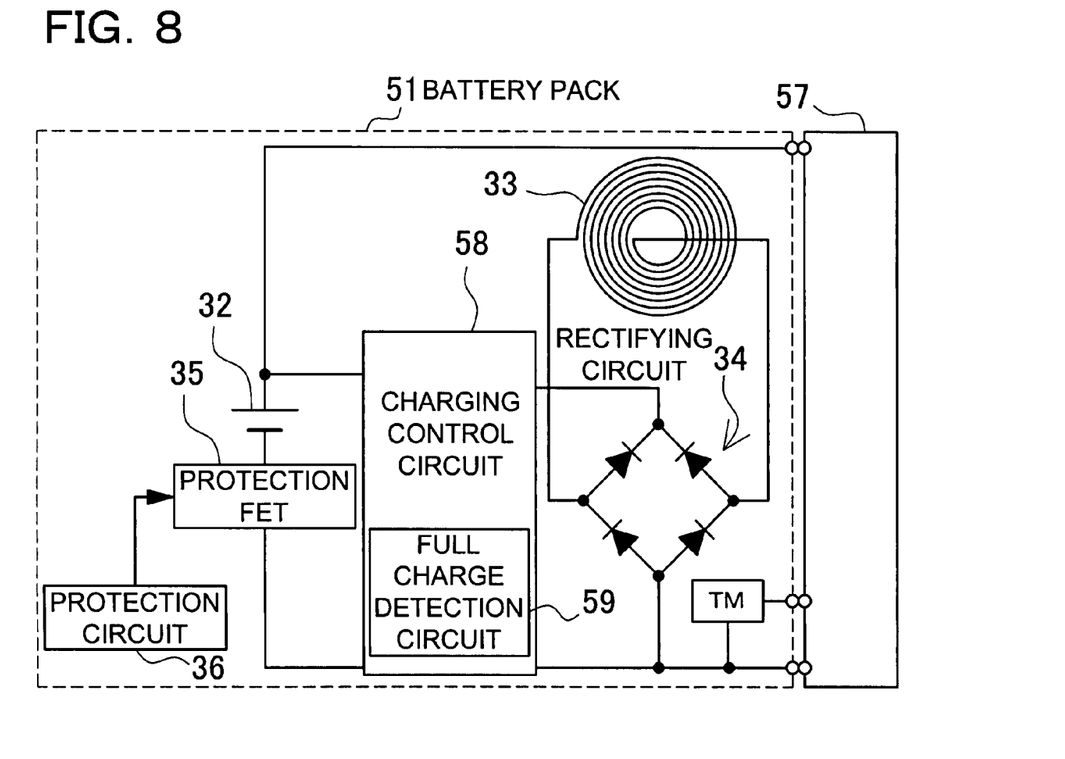
FIG. 8 is a circuit diagram showing another embodiment of the battery pack housed in the portable electronic equipment.

The battery pack 31, 51, which is housed in portable electronic equipment 30 that is set in charging position on the top plate 11A and charged by the battery charger 10, is shown in the circuit diagrams of FIGS. 7 and 8. The battery pack 31 of FIG. 7 is provided with a rechargeable battery 32, a secondary coil 33, and a diode bridge rectifying circuit 34 to rectify high frequency power induced in the secondary coil 33. In this battery pack 31, DC output from the rectifying circuit 34 is output to the electronic equipment circuit side 37 of the portable electronic equipment 30. The battery pack 31 of FIG. 7 is also provided with a protection field effect transistor (FET) 35 connected in series with the rechargeable battery 32, and a protection circuit 36 to control the protection FET 35 ON and OFF to protect the rechargeable battery 32. The protection circuit 36 switches the protection FET 35 ON and OFF to prevent over-charging and over-discharging of the rechargeable battery 32. The portable electronic equipment 30 that houses this battery pack 31 also houses a rechargeable battery 32 charging control circuit 38 in the electronic equipment circuit side 37. The charging control circuit 38 charges the rechargeable battery 32 with DC power from the rectifying circuit 34. In this portable electronic equipment 30, since DC power from the rectifying circuit 34 is input directly to the charging control circuit 38 to charge the rechargeable battery 32, DC power output from the rectifying circuit 34 can be used to efficiently charge the rechargeable battery 32. This is because there is no need for any voltage stabilization circuitry, which has associated power loss, in the battery pack 31.

The battery pack 51 of FIG. 8 houses a rechargeable battery 32 charging control circuit 58. This charging control circuit 58 fully charges the rechargeable battery 32 with DC power output directly from the rectifying circuit 34. The charging control circuit 58 is provided with a full charge detection circuit 59 to detect when the rechargeable battery 32 is fully charged. When the rechargeable battery 32 reaches full charge, the full charge detection circuit 59 issues a full charge signal. The full charge signal is output from the secondary coil 33 and transmitted from the secondary coil 33 to the primary coil 13. The battery charger 10 houses a charge termination circuit 29 that suspends charging when a full charge signal from the full charge detection circuit 59 is detected. The battery charger 10 houses the charge termination circuit 29 inside the high frequency power supply 14. When the charge termination circuit 29 detects a full charge signal transmitted from the battery pack 51 full charge detection circuit 59, it stops supplying high frequency power to the primary coil 13. This battery pack 51 transmits a full charge signal to the battery charger 10 when the rechargeable battery 32 is fully charged. Accordingly, the battery charger 10 can detect the full charge signal transmitted from the battery pack 51 and can stop supplying high frequency power to the primary coil 13. Therefore, when the battery pack 51 is fully charged, supply of power to the high frequency power supply 14 is cut-off and wasted power consumption is avoided. In FIG. 8, 57 indicates the electronic equipment circuit side.

Although not illustrated, the circuit of FIG. 8 can also include circuitry for the following authentication procedure. With such circuitry, an identification (ID) signal is sent from the primary coil 13 and received by magnetic induction in the secondary coil 33. If the ID signal can be confirmed and authenticated by the battery pack 51 or portable electronic equipment 30, charging is begun, but if the ID signal cannot be confirmed or authenticated, charging is terminated. When the battery pack 51 or portable electronic equipment 30 confirms and authenticates the ID signal, an ID confirmation signal to indicate confirmation of the ID signal is sent from the battery pack 51 or portable electronic equipment 30 to the primary coil 13 via the secondary coil 33. The battery charger 10, which contains the primary coil 13, receives the ID confirmation signal and continues to supply power. When an ID confirmation signal cannot be received, it is assumed that the battery pack or portable electronic equipment is incompatible with the battery charger 10 and the supply of power is stopped.

Figure 9:
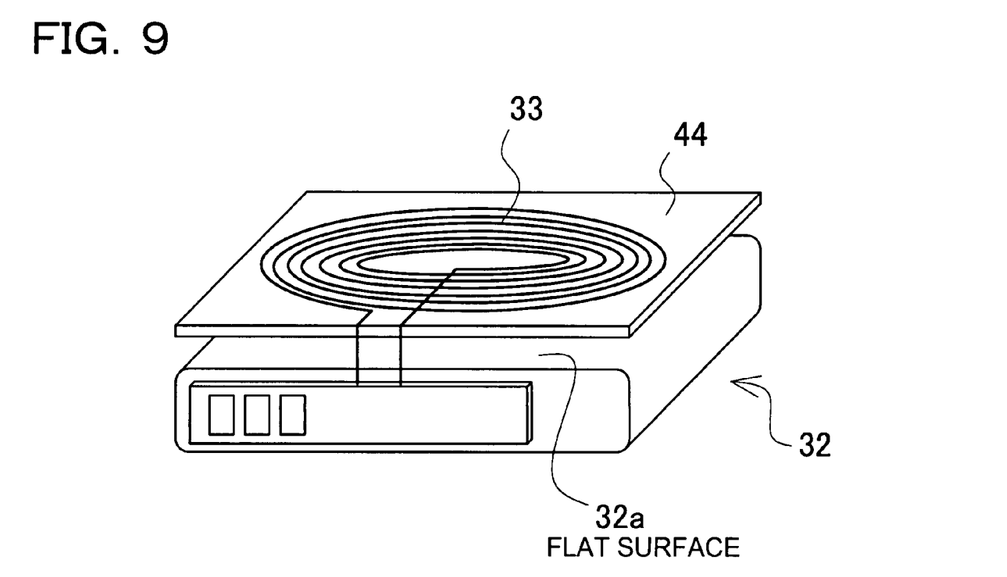
FIG. 9 is a perspective view showing one embodiment of the rechargeable battery and secondary coil housed in the battery pack.

As shown in FIG. 5, the battery pack 31 housed in portable electronic equipment 30 contains a rechargeable battery 32 and the secondary coil 33. As shown in FIG. 9, the rechargeable battery 32 contained in the battery pack 31 is a rectangular battery with two opposing flat surfaces 32a. Further, the secondary coil 33 contained in the battery pack 31 is a planar coil wound in a spiral pattern. The secondary coil 33 shown in FIG. 9 is made essentially as large as the entire rechargeable battery 32 to allow efficient capture of high frequency power transmitted from the primary coil 13. In the battery pack 31, the planar secondary coil 33 is stacked on the flat surface 32a of the rectangular rechargeable battery 32 disposing the rechargeable battery 32 and secondary coil 33 in fixed relative positions. As shown in FIG. 5, the battery pack 31 holds the rechargeable battery 32 and secondary coil 33 in a manner that positions the secondary coil 33, which is stacked on the rechargeable battery 32, adjacent to the top plate 11A side of the battery charger 10 and opposite the primary coil 13 when the portable electronic equipment 30 is set for charging on the battery charger 10 top plate 11A.

Further, as shown in FIG. 9, the secondary coil 33 is disposed in the battery pack 31 via an electromagnetic absorption layer 44 to protect the rechargeable battery 32 from detrimental effects of the magnetic field from the primary coil 13. The electromagnetic absorption layer 44 contains magnetic material to allow it to absorb electromagnetic energy from the primary coil 13. The electromagnetic absorption layer 44 shown in FIG. 9 is sheet material containing magnetic material, and is made by forming a sheet of synthetic resin with added powder such as metal, carbon, or ferrite. As shown in FIG. 9, an electromagnetic absorption layer 44 in sheet form is stacked on the flat surface 32a of the rechargeable battery 32 and the secondary coil 33 is attached to the top surface of the electromagnetic absorption layer 44. In this manner, the secondary coil 33 is disposed on the flat surface 32a of the rechargeable battery 32 with the electromagnetic absorption layer 44 intervening between the two.

Figure 10:
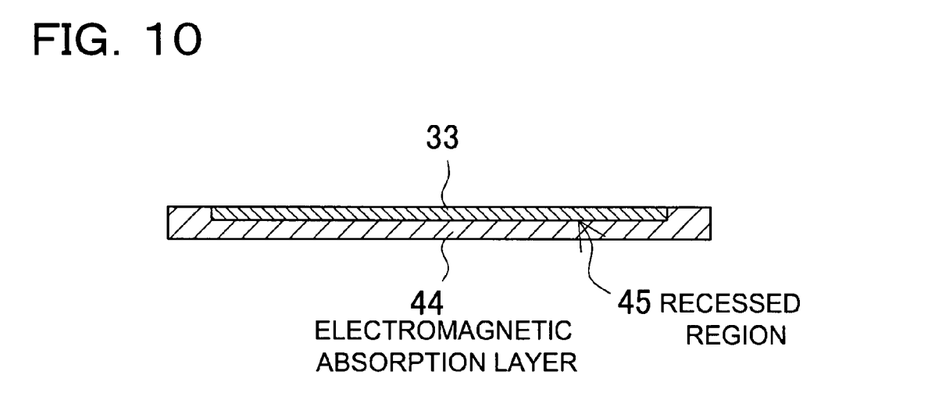
FIG. 10 is a cross-sectional view of the electromagnetic absorption layer shown in FIG. 9.

The electromagnetic absorption layer 44 shown in FIG. 10 is provided with a recessed region 45 to hold the secondary coil 33 in the top surface of the planar electromagnetic absorption layer 44. The secondary coil 33 disposed in the recessed region can be bond-attached to retain it in a fixed position in the electromagnetic absorption layer 44. The secondary coil 33 can also be insertion molded into the resin of the electromagnetic absorption layer 44 disposing it in a recessed region 45. An electromagnetic absorption layer 44 with the secondary coil 33 insertion molded has the characteristic that while the entire assembly is thin, the secondary coil 33 can be solidly held in the electromagnetic absorption layer 44 top surface.

Figure 11:
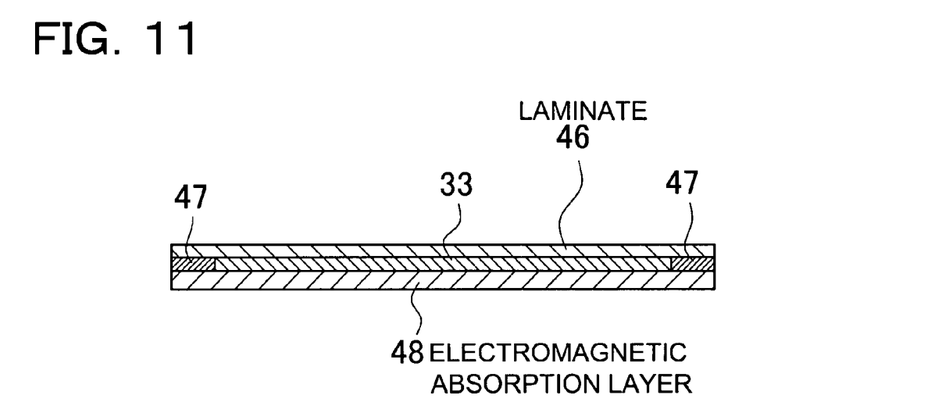
FIG. 11 is a cross-sectional view showing another embodiment of an electromagnetic absorption layer.

As shown in FIG. 11, the secondary coil 33 can also be retained by sandwiching it between an electromagnetic absorption layer 48 and a laminate 46. The secondary coil 33 shown in FIG. 11 is disposed on top of the surface of the electromagnetic absorption layer 48 and spacers 47 are oriented around the coil's perimeter. Further, a laminate 46 is provided on top to hold the secondary coil 33 between the electromagnetic absorption layer 48 and the laminate 46. This configuration has the characteristic that the assembly can be easily attached to the flat surface 32a of the rechargeable battery 32 while protecting the surface of the secondary coil 33 with laminate 46.

Figure 12:
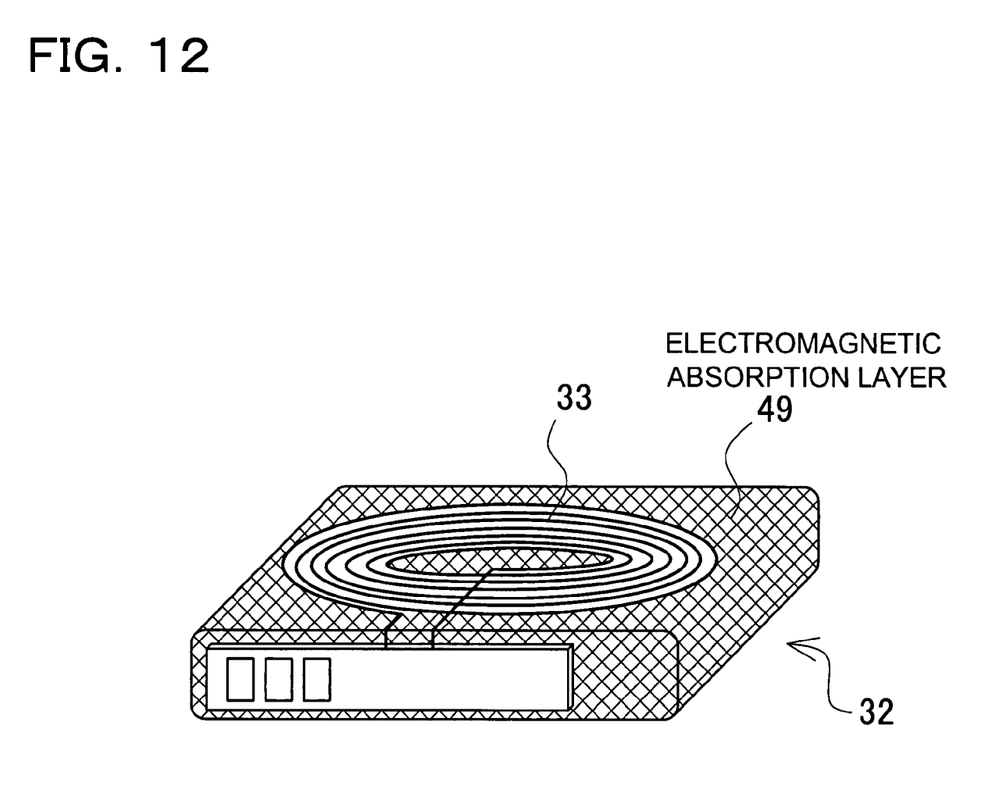
FIG. 12 is a perspective view showing another embodiment of an electromagnetic absorption layer.

Finally, as shown in FIG. 12, the electromagnetic absorption layer 49 can be applied directly to coat the surface of the rechargeable battery 32. Here, the electromagnetic absorption layer 49 is formed by adding powder such as metal, carbon, or ferrite to coating material that is applied directly on rechargeable battery 32 surfaces. In the rechargeable battery 32 of FIG. 12, coating is applied around the entire rechargeable battery 32 to establish the electromagnetic absorption layer 49 shown by cross-hatching. This configuration has the characteristic that a magnetic shield surrounds the entire rechargeable battery 32 and can protect it from the detrimental effects of the primary coil 13 magnetic field. However, although not illustrated, the electromagnetic absorption layer can also be formed by applying coating only to the flat surface of the rechargeable battery where the secondary coil is stacked.

As described above, a configuration that mounts the secondary coil 33 on the rechargeable battery 32 via an electromagnetic absorption layer 44, 48, 49 has the characteristic that magnetic field effects such as eddy currents (Foucault currents) in the rechargeable battery 32 case, which can cause adverse effects such as battery heating, are effectively prevented. At the same time, this configuration has the characteristic that since lines of magnetic force radiating from the primary coil 13 do not affect the rechargeable battery 32, the efficiency of the power transfer from the primary coil 13 to the secondary coil 33 is increased. It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2006-219448 filed in Japan on Aug. 11, 2006, the content of which is incorporated herein by reference.

What is claimed is:

1. A battery charger without electrical contacts comprising:
a primary coil magnetically coupled to a secondary coil housed in portable electronic equipment;
a high frequency power supply that supplies high frequency power to the primary coil; and
an external case that holds the primary coil and the high frequency power supply, wherein the high frequency power supply converts input power to high frequency power and supplies it to the primary coil, primary coil high frequency power is conveyed to the secondary coil by magnetic induction, and secondary coil AC is rectified to charge the battery pack contained in the portable electronic equipment,
the battery charger without electrical contacts is provided with internal batteries that are charged by input power and supply power to the high frequency power supply, and with a charging circuit that charges the internal batteries with input power,
the external case is formed as a flat panel having a given thickness providing storage space for internal batteries between a top plate and a bottom plate, internal batteries housed in the external case storage space are rectangular batteries and these rectangular batteries are housed in the storage space with their two opposing flat surfaces oriented parallel to the top plate and bottom plate, and a planar primary coil wound in a spiral shape is disposed in the external case storage space or in the top plate,
wherein the internal batteries are charged by input power; when no power is input, the high frequency power supply converts power supplied from the internal batteries to high frequency power and supplies it to the primary coil to charge the portable electronic equipment battery pack, and
wherein the high frequency power supply contains a circuit to detect internal battery remaining capacity and supply DC power from the internal batteries to the high frequency power supply when remaining capacity is detected that is greater than a set capacity.

2. The battery charger without electrical contacts as recited in claim 1, wherein the internal batteries are lithium ion rechargeable batteries or lithium polymer batteries.

3. The battery charger without electrical contacts as recited in claim 2, wherein the internal batteries are rectangular batteries.

4. The battery charger without electrical contacts as recited in claim 1, wherein the high frequency power supply is provided with an electronic equipment detection circuit to detect when portable electronic equipment is set for charging.

5. The battery charger without electrical contacts as recited in claim 1, further comprising a controller that detects an electronic equipment data signal induced in the primary coil to determine that portable electronic equipment is set for charging.

6. The battery charger without electrical contacts as recited in claim 1, wherein DC input terminals are provided in the external case, and the DC input terminals are connected to the high frequency power supply and charging circuit.

7. The battery charger without electrical contacts as recited in claim 6, wherein the DC input terminals are made up of AC adapter connection terminals and USB terminals, and the connection terminals and USB terminals are connected to the high frequency power supply and charging circuit.

8. A battery charger without electrical contacts comprising:
a primary coil magnetically coupled to a secondary coil housed in portable electronic equipment;
a high frequency power supply that supplies high frequency power to the primary coil; and
an external case that holds the primary coil and the high frequency power supply, wherein the high frequency power supply converts input power to high frequency power and supplies it to the primary coil, primary coil high frequency power is conveyed to the secondary coil by magnetic induction, and secondary coil AC is rectified to charge the battery pack contained in the portable electronic equipment,
the battery charger without electrical contacts is provided with internal batteries that are charged by input power and supply power to the high frequency power supply, and with a charging circuit that charges the internal batteries with input power,
the external case is formed as a flat panel having a given thickness providing storage space for internal batteries between a top plate and a bottom plate, internal batteries housed in the external case storage space are rectangular batteries and these rectangular batteries are housed in the storage space with their two opposing flat surfaces oriented parallel to the top plate and bottom plate, and a planar primary coil wound in a spiral shape is disposed in the external case storage space or in the top plate,
wherein the internal batteries are charged by input power; when no power is input, the high frequency power supply converts power supplied from the internal batteries to high frequency power and supplies it to the primary coil to charge the portable electronic equipment battery pack,
wherein DC input terminals are provided in the external case, and the DC input terminals are connected to the high frequency power supply and charging circuit,
wherein the DC input terminals are made up of AC adapter connection terminals and USB terminals, and the connection terminals and USB terminals are connected to the high frequency power supply and charging circuit, and
wherein the AC adapter connection terminals, USB terminals, and internal batteries are connected to the power supply circuit of the high frequency power supply via a series connected switch and diode.

9. The battery charger without electrical contacts as recited in claim 7, wherein the battery charger is operable to detect when portable electronic equipment is set for charging, and when no DC power is input from either the AC adapter connection terminals or USB terminals, to supply power from the internal batteries to the high frequency power supply.

10. The battery charger without electrical contacts as recited in claim 7, wherein the battery charger is operable to detect when internal batteries are not fully charged, when portable electronic equipment is not set for charging, and when DC power is input from either the AC adapter connection terminals or USB terminals, to charge the internal batteries.

11. The battery charger without electrical contacts as recited in claim 6, wherein the DC input terminals are established on a sidewall of the external case.

12. The battery charger without electrical contacts as recited in claim 1, wherein the internal batteries, primary coil, high frequency power supply, and charging circuit are disposed in a single plane in the external case storage space.

13. The battery charger without electrical contacts as recited in claim 1, wherein a plurality of internal batteries are disposed in a single plane and held in the external case storage space.

14. The battery charger without electrical contacts as recited in claim 1, wherein the battery charger has an overall thin, flat panel shape.

15. The battery charger without electrical contacts as recited in claim 13, wherein rectangular batteries, which are thinner than they are wide, are housed in the flat panel external case.

16. The battery charger without electrical contacts as recited in claim 1, further comprising a display section to display internal battery remaining capacity.

17. A combination of the battery charger as recited in claim 1 and portable electronic equipment wherein the battery pack housed in the portable electronic equipment is provided with a secondary coil, and a rectifying circuit that rectifies AC induced in the secondary coil; and rectifying circuit output is input to the portable electronic equipment.

18. The combination of battery charger without electrical contacts and portable electronic equipment as recited in claim 17, wherein the battery pack housed in the portable electronic equipment contains a full charge detection circuit that detects full charge of the rechargeable battery, and the battery charger houses a charge termination circuit that detects a full charge signal issued from the full charge detection circuit and terminates charging.

19. The combination of battery charger without electrical contacts and portable electronic equipment as recited in claim 17, wherein the battery pack is provided with a rectangular battery having two opposing flat surfaces, and the secondary coil is disposed on a flat surface of the rectangular battery via an electromagnetic absorption layer.

20. The combination of battery charger without electrical contacts and portable electronic equipment as recited in claim 19, wherein the electromagnetic absorption layer is provided with a recessed region and the secondary coil is disposed in this recessed region.

21. The combination of battery charger without electrical contacts and portable electronic equipment as recited in claim 19, wherein the secondary coil is insertion molded in the electromagnetic absorption layer.

22. The combination of battery charger without electrical contacts and portable electronic equipment as recited in claim 19, wherein the secondary coil is sandwiched between the electromagnetic absorption layer and a laminate.

* * * * *